United States Patent [19]

Kinoshita

[11] 4,174,198
[45] Nov. 13, 1979

[54] FOREIGN MATERIAL REMOVING DEVICE IN SYNTHETIC RESIN RECLAIMING MACHINE

[75] Inventor: Tomoo Kinoshita, Tokyo, Japan

[73] Assignee: Nihon Repro Machine Kogyo Kabushiki Kaisha, Tokyo, Japan

[21] Appl. No.: 940,602

[22] Filed: Sep. 8, 1978

[30] Foreign Application Priority Data

Sep. 14, 1977 [JP] Japan .................... 52/109953

[51] Int. Cl.² ............................................ B29B 1/12
[52] U.S. Cl. ................................. 425/135; 210/407;
210/408; 264/37; 264/40.4; 264/169;
264/DIG. 69; 425/197; 425/198
[58] Field of Search ..... 425/197, 198, 812, DIG. 119,
425/215, 135; 210/407, 408

[56] References Cited

U.S. PATENT DOCUMENTS

| | | | |
|---|---|---|---|
| 1,987,142 | 1/1935 | Clements | 210/408 |
| 2,275,958 | 3/1942 | Hagel | 210/408 |
| 2,786,504 | 3/1957 | Samler | 425/198 |
| 3,055,290 | 9/1962 | Arvanitakis | 210/407 |
| 3,326,383 | 6/1967 | Pranovi | 210/407 |
| 3,495,299 | 2/1970 | Chazal et al. | 425/197 |
| 3,817,377 | 6/1974 | Piggott | 425/197 |
| 3,823,831 | 7/1974 | LeBlanc | 210/408 |
| 3,932,102 | 1/1976 | Rosenbaum | 425/197 |
| 3,940,335 | 2/1976 | Kalman | 425/197 |
| 3,971,721 | 7/1976 | Fogarty | 425/197 |
| 4,051,574 | 10/1977 | Gaspar | 425/197 |
| 4,082,487 | 4/1978 | Rapp | 425/135 |

Primary Examiner—John C. Bleutge
Assistant Examiner—A. H. Koeckert
Attorney, Agent, or Firm—Oblon, Fisher, Spivak, McClelland & Maier

[57] ABSTRACT

A foreign material removing device in a synthetic resin reclaiming machine including an extruder having a screw shaft, a filter cylinder connected to the extruder, a resin filter mounted within the filter cylinder so as to form a resin chamber therebetween, a scraper shaft positioned within the filter cylinder and including projected strips as scraper which protrude aslant to the axis of the scraper shaft such that the strips contact the inner surface of the filter and interconnect with the screw shaft, a body fixed to the filter cylinder which includes a first guide hole, one end thereof being connected to the inside of the filter cylinder, an ejecting port, and a second guide hole disposed in an orthogonal direction with respect to the axis of the scraper so as to connect the first guide hole to the foreign material ejecting port further including a plurality of resin passages communicating with the resin chamber, a plurality of dies fixed to the body which include connecting passages for ejecting resin and a plurality of nozzle holes connecting to the resin ejecting passages, a squeezing piston connected to the body which reciprocates within a sliding guide hole, a slide piston operatively associated with the squeezing piston for contacting the squeezing piston, and a spring member for biasing the slide piston toward the squeezing piston.

8 Claims, 9 Drawing Figures

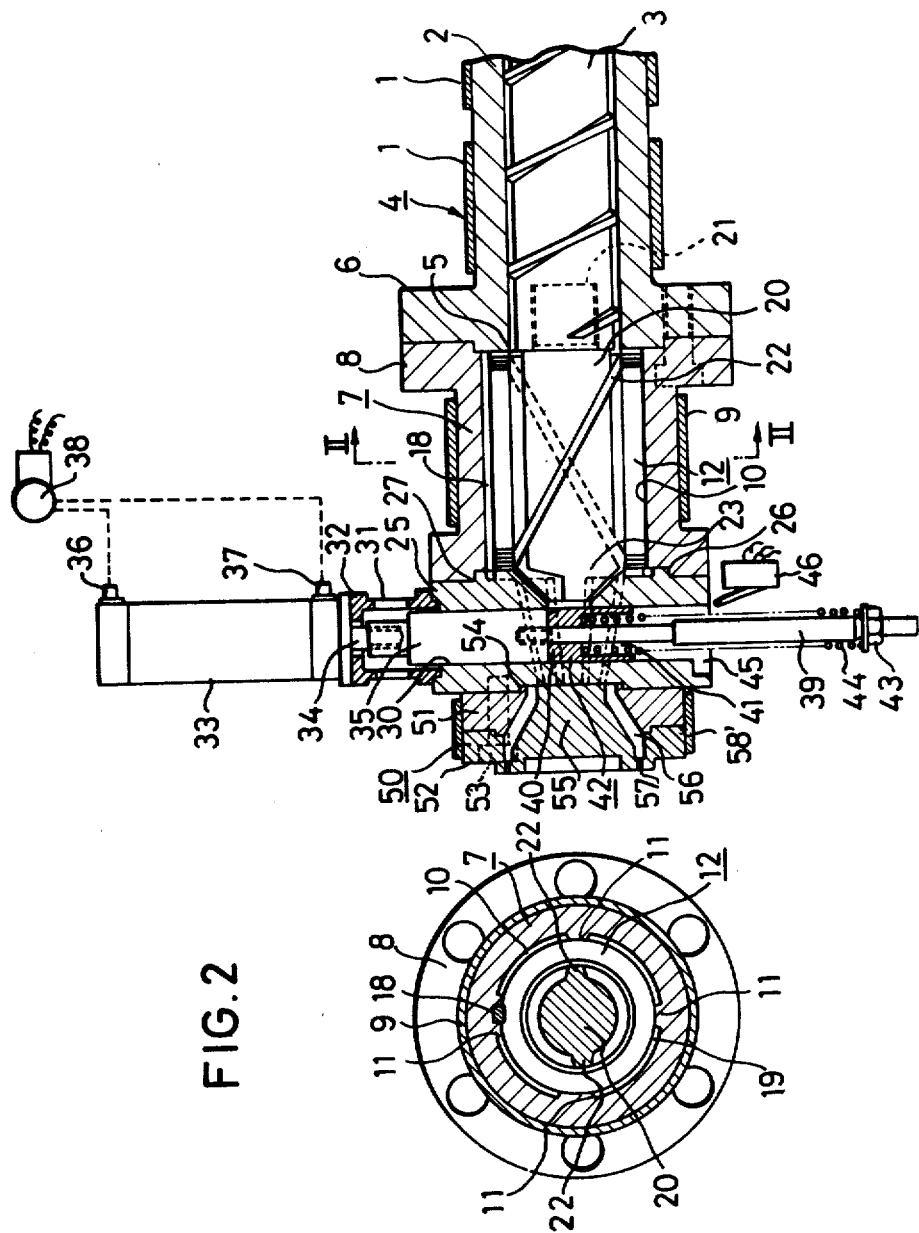

FOREIGN MATERIAL REMOVING DEVICE IN SYNTHETIC RESIN RECLAIMING MACHINE

BACKGROUND OF THE INVENTION

1. Field of the Invention

This invention relates to the foreign material removing device of a synthetic resin reclaiming machine.

2. Description of the Prior Art

In the process of pelletizing thermoplastic synthetic resin waste for the purpose of reusing it, the waste is usually crushed and hot sheared or extruded linearly through an extruder and cut to a small size as pellets. Because of many impurities mixed in the waste, a breaker plate is usually attached to the end of the extruder to remove impurities and a metal screen is stretched to the breaker plate to filter impurities to obtain more purely reclaimed synthetic resin.

However, many wastes are mixed with non-melting foreign materials such as thermosetting resins, inserted metals, aluminum foils, cellophane, paper, etc., causing quick clogging of the screen of the breaker plate requiring frequent exchange of the screen and resulting in low efficiency. This troublesome exchange work of the screen cannot keep one from consideration of combustion disposal, disregarding that the material is a precious product of petroleum. However combustion emits invisible poisonous gas to the atmosphere and thus causes a pollution problem which has a bad effect on both animals and plants.

SUMMARY OF THE INVENTION

The object of this invention is to provide a foreign material removing device of a synthetic resin reclaiming machine, which removes foreign materials in the waste attached to the filter, automatically, and can eject the removed foreign materials to outside the machine.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a longitudinal sectional view of the present invention;

FIG. 2 is a sectional view along the line II—II of FIG. 1;

DETAILED DESCRIPTION OF THE PREFERRED EMBODIMENTS

Figure 3:
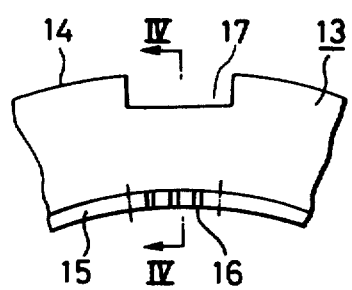
FIG. 3 is the elevation showing a part of the filter group of the present invention.

As shown in FIG. 1, flange 6 is installed on the outer circumference of an ejection port 5 of an extruder 4. Extrusion cylinder 2 is equipped circumferentially with heaters 1,1, a screw shaft 3 horizontally installed on the inside thereof to be free to rotate, and a flange 8 which is provided on the circumference of a filter cylinder 7 fixed to the flange 6 so as to connect the extruder 4 with the filter cylinder 7 such that filter cylinder 7 is downstream of extruder 4.

Figure 4:
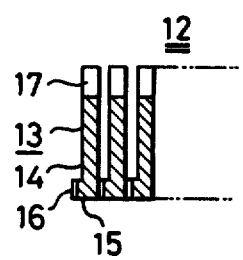
FIG. 4 is a sectional view along the line IV—IV of FIG. 3.

The filter cylinder 7 is kept heated with a heater 9 installed on its periphery and the inside wall 10 of filter cylinder 7 is of a larger diameter than the inside diameter of squeezing cylinder 2. Four filter fixing projections or points 11, (as shown in FIG. 2), are projected at four points (each 90° apart) along the inside wall 10. Inside of these filter fixing points 11, a filter group 12 is inserted and fixed and consists of a plurality of filters 13, piled up as shown in FIGS. 3 and 4. The inner circumference of a thin, ring-shaped metallic disc 14 of each filter 13 is provided with a square section projection 15, in which many filtration holes 16 are radially disposed, and a key groove 17 is formed at the periphery thereof. Key groove 17 is formed on filters 13 which are inserted on a key 18 which is operatively associated with one of the filter fixing points 11 so that each filter 13 will not be separated from the remaining filters. Resin chambers 19 are also formed in the space provided between each filter fixing point 11 of the inner wall 10 of the filter cylinder 7 and filter group 12.

Figure 5:
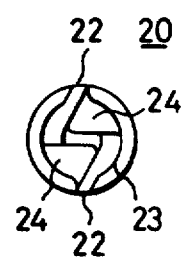
FIG. 5 is an elevational view of the scraper shaft of the present invention.

In the interior of the filter cylinder 7, an end of a scraper shaft 20 having the same diameter as that of screw shaft 3 is provided with a small diameter threaded part 21 which is screw fitted with screw shaft 3 to form one body and rotate together. On the exterior surface of the scraper shaft 20 two projected strips 22, 22, serving as scrapers, are projected and are inclined to the axis of the shaft, mutually crossed, and contact the inner surface of filter group 12. A head end 23 of scraper shaft 20 is formed as a circular truncated cone, with two notches opposite each other as shown in FIG. 5 to form a foreign matter guide 24, 24 and is inserted into the body 25 which will be described hereinafter.

Figure 7:
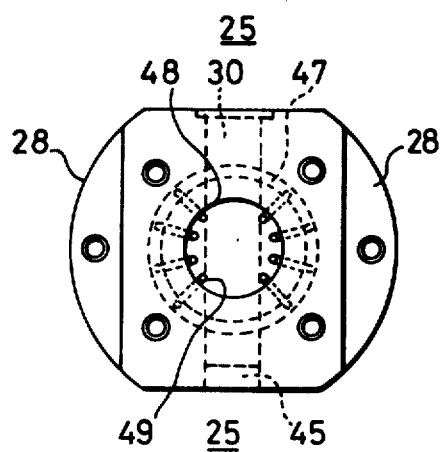
FIG. 7 is the elevational view of the body of the present invention.
Figure 6:
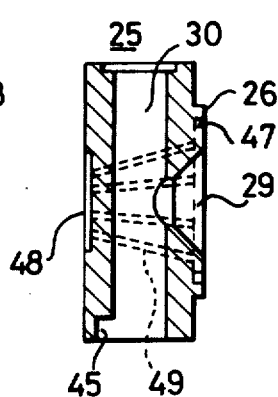
FIG. 6 is a sectional view of the body of the present invention.

A projected part 26 is provided at one end of the body 25 and is fitted to a recess 27 formed in the ejection side of filter cylinder 7 with body 25 being fixed to the cylinder 7 and downstream thereof by securing flanges 28, 28 which are disposed at both sides of the body 25 as shown in FIG. 7. The body 25 includes a circular truncated cone guide hole 29 (as shown in FIG. 6) on one side of projected part 26 to accommodate the head end part 23 of the scraper shaft 20, and is bored at the center thereof in a vertical direction to form a sliding guide hole 30 which is connected with guide hole 29. At the upper surface of this body 25 a mounting face 32 is rigidly secured with legs 31.

An air cylinder 33 is fixed upon the mounting face 32, through which a piston rod 34 is projected downwardly with a squeezing piston 35 being attached to the lower end thereof to fit in sliding guide hole 30. Furthermore, the lower end of the squeezing piston 35 is disposed so as to be on the same level as the upper end of the guide hole 29 at its upper stroke end. The prescribed air cylinder 33 is arranged so as to enable the shifting of air induction by connecting ports 36 or 37 to a pump (not shown) through an electromagnetic directional control valve 38.

A center rod 39 is screwed to the lower end of the squeezing piston 35, to which a slide piston 42, which is formed with inclined surface 40 at its upper circumference, is attached to form a hollow part or space 41 within the sliding guide hole 30. A coil spring 44 is expandedly set between an adjusting nut 43 screwed in the lower end of the center rod 39 and the hollow part 41 of the slide piston 42. The adjusting nut 43 can adjust the coil spring 44 so that slide piston 42 can descend when the pressure of resin in the filter cylinder 7 becomes greater than 10 kg/cm² with the slide piston 42 being arranged to be able to keep an upward position so as to be engaged with the squeezing piston 35.

A foreign material ejecting port 45 is formed at the lower end of the sliding guide hole 30 of the body 25 which opens as shown at the left side in FIG. 1. Further, a limit switch 46 is installed at the lower side of the body 25, operating with the lower surface of slide piston 42 so as to emit signals to electromagnetic directional control valve 38 to shift the air introduced in the air cylinder 33.

A circular inducing groove 47 is provided adjacent the projected part 26 of the body 25 so as to be connected to resin chamber 19. A circular notch 48 also provided on the opposite side (as shown in FIG. 6) and two consecutive resin passages 49 are each provided for each resin chamber 19 and are radially connected between inducing groove 47 and notch 48 (as shown in FIGS. 6 and 7), thus avoiding a portion of the sliding guide hole 30.

Dies 50 (FIG. 1) are fixed to the body 25 at the opposite side thereof from that of filter cylinder 7. The dies 50 consist of an inside die 51 and an outside die 52, and both dies 51 and 52 are superposed and fixed to the body 25 by bolts 53. Inside die 51 is formed of a hollow positioning projection part 54 within notch 48, and the outside die 52 is formed with a projection part 55 which has clearance with inside die 51 along an entire circle and projection part 55 is inserted into notch 48 forming resin ejection passage 56 between the inside die 51 and projection part 55, thus connecting resin ejection passage 56 to each of the prescribed resin passages 49. Also, a plurality of nozzle holes 57 are provided on the opposite side and the external surface of the dies 50 are surrounded with a heater 58'.

In operation, when crushed thermoplastic resin waste is thrown in a hopper of the extruder 4, it will be sent by the screw shaft 3 and transferred as a melt by heater 1, while being pressed into filter cylinder 7. The molten resin is then sent to the resin chambers 19 through filter holes 16 and between each filter 13, and is sent to the resin ejection passage 56 of the dies 50 through respective resin passages 49. It is then ejected in a string form through nozzle holes 57.

On the other hand, unmelted foreign matter 58 contained in the waste will adhere to the inner surface of the filter group 12 because it cannot pass through the filtration holes 16. Because the projected scraping strips 22 attached to the scraper shaft 20 are contaced with the filter group 12, the foreign matter 58 adhering to the filter group 12 are scraped off by projected scraping strips 22, transferred successively to the end and collected to the center by foreign matter guides 24, 24 and sent to the guide hole 29 (FIG. 6) of the body 25.

Figure 8A:
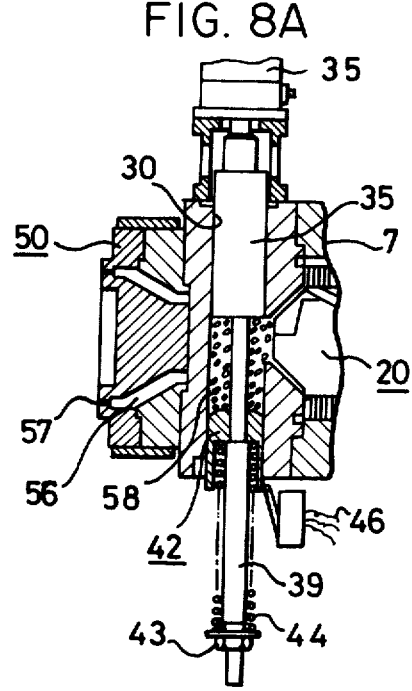
FIGS. 8A and 8B are explanatory drawings showing, respectively, the operation of the squeezing piston and slide piston.
Figure 8B:
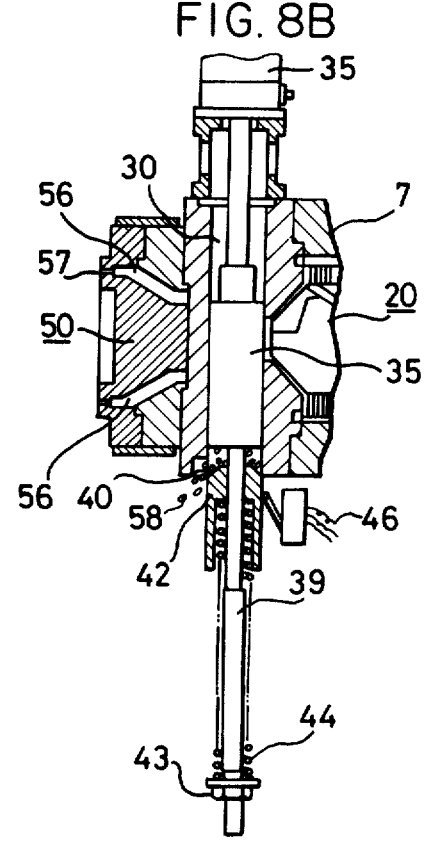

When large amounts of foreign material are accumulated in the foreign matter guide 24, 24 and the guide hole 29 and the pressure of the resin in the filter cylinder hole 7 rises to more than 10 kg/cm², which is the preset pressure by the coil spring 44, they are forced out by the pressure and the foreign matter 58 (FIG. 8A) is pressed into the gap between the inclined surface 40 of slide piston 42 and the squeezing piston 35. Accumulation of foreign matter 58 between both pistons 35 and 42 will depress the slide piston 42 successively downwards against the spring force of the coil spring 44 and large amounts of foreign matter will accumulate in the sliding guide hole 30. When slide piston 42 continues to descend until the lower end actuates the limit switch 46 (FIG. 8A), a signal is sent to the electromagnetic directional control valve 38 and to a timer switch connected to this electromagnetic directional control valve. The direction of air induction of the electromagnetic directional control valve 38 is thus changed causing squeezing piston 35 to be displaced downwardly. This downward motion of the squeezing piston 35 makes the foreign matter 58 descend with the slide piston 42 within the sliding guide hole 30, and the foreign matter 58 will be subjected to the atmospheric pressure when it comes to the position of the foreign material ejecting port 45 and automatically ejected to the outside from the foreign matter ejecting port by means of the repulsion pressure of the strong coil spring 42. Therefore, the squeezing piston 35 continues to descend successively, and the slide piston 42 maintaining the position of FIG. 8B successively ejects matter to the outside through the foreign material ejecting port 45. When the lower end of the squeezing piston 35 descends as far as to the upper end of the foreign material ejecting port 45, the ejection of foreign matter 58 will be completed and the slide piston 42 will contact the squeezing piston 35. The timer switch (not shown) operates at the time when the above-described foreign matter ejecting process is completed, and serves to change the direction of air induction of the electromagnetic directional control valve and raise the squeezing piston 35 to allow the slide piston 42 to rise by means of the repulsion force of the coil spring 44 so as to return the original position shown in FIG. 1. At the same time, the limit switch 46 returns to the original position and is thus prepared for the next operation command.

When the described squeezing piston 35 descends to its lower stroke end the upper end of squeezing piston 35 is in a slightly higher position in the guide hole 29, bringing the guide hole 29 to a closed condition, thus prevent foreign matter 58 and molten resin from intruding into the upper side of the sliding guide hole 30.

Foreign matter 58 is automatically ejected time and time again to the outside by repeating the above-described operation successively.

Because the invention has such structure and function as explained in the descrived example embodiment, foreign matter included in the waste of synthetic resin will be automatically sent to the guide hole 29 of the body 25, and then from this guide hole to the sliding guide hole 30, and can be ejected outside from the sliding guide hole 30 by way of the separate up and downward movement of slide piston 42 and the squeezing piston 35.

Further, the filter 13 will be kept clean of foreign matter by projected scraping strips 22, 22 of the scraper shaft 20, and there is no need to stop the machine operation to change the filter to remove clogging, thus enabling continuous operation with resulting very high efficiency.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A foreign material removing device in a synthetic resin reclaiming machine which comprises:
   an extruder having a screw shaft;
   a filter cylinder connected to the extruder and downstream thereof;
   a resin filtration filter mounted within said filter cylinder so as to form a resin chamber between said filter and said filter cylinder;
   a scraper shaft positioned within the filter cylinder and including projected strips as scrapers which protrude aslant to the axis of the scraper such that the strips contact the inner surface of the filter and interconnect with the screw shaft;
   a body fixed to the filter cylinder downstream thereof, which includes a first guide hole, one end of the body being connected to the inside of the filter cylinder, an ejecting port, and a second guide hole disposed in an orthogonal direction with respect to the axis of the scraper so as to connect said first guide hole to said ejecting port, further including a plurality of resin passages communicating with said resin chamber;
   a plurality of dies fixed to the body which include connecting passages for ejecting resin and a plurality of nozzle holes connecting to said resin ejecting passages;
   a squeezing piston connected to the body which reciprocates within said second guide hole;
   means for reciprocating said squeezing piston connected to said squeezing piston;
   a slide piston operatively associated with said squeezing piston for contacting said squeezing piston, and
   a spring member for biasing said slide piston toward said squeezing piston.

2. A foreign material removing device for synthetic resin reclaiming machine as set forth in claim 1 which further comprises:
   a projection formed on the periphery of said filter including a plurality of filtering holes formed in a radial direction thereof and wherein a plurality of said filters are provided such that said projection is disposed against a non-projecting part of the surface of a neighboring filter to form a filter group.

3. A foreign material removing device for a synthetic resin reclaiming machine as set forth in claim 2 wherein a plurality of filter fixing projections project in the inner circumference of the filter cylinder, within which said filter group is inserted to form said resin chamber.

4. A foreign material removing device of a synthetic resin reclaiming machine as set forth in claim 1 wherein said first guide hole in the body forms a circular truncated cone and a head part of the scraper shaft forms a circular truncated member including two notches at a head part disposed within said first guide hole to serve as a guide for foreign materials.

5. A foreign material removing device of a synthetic resin reclaiming machine as set forth in claim 1 which further comprises:
   hydraulic means for reciprocably driving said squeezing piston.

6. A foreign material removing device of a synthetic resin reclaiming machine as set forth in claim 1 wherein a lower end of the said squeezing piston is, at the upper end of its stroke, positioned on the same level as the upper face of said second guide hole and at the lower end of its stroke the upper end of the squeezing position is positioned on the same level as the upper face of said second guide hole.

7. A foreign material removing device of a synthetic resin reclaiming machine as set forth in claim 1 which further comprises:
   a center rod secured to the lower side of the squeezing piston wherein said spring member is mounted on said center rod.

8. A foreign material removing device of a synthetic resin reclaiming machine as set forth in claim 1 which further comprises:
   an electromagnetic directional control valve means for reciprocating said squeezing piston, and
   a limit switch detecting the down position of the slide piston electrically connected to said electromagnetic directional control valve means.

* * * * *